March 26, 1929. P. MacGAHAN Re. 17,244

METER STRUCTURE

Original Filed May 24, 1923

WITNESSES:
S. H. Volker.
F. H. Miller

INVENTOR
Paul MacGahan.
BY
Wesley G. Clearr
ATTORNEY

Reissued Mar. 26, 1929. Re. 17,244

UNITED STATES PATENT OFFICE.

PAUL MacGAHAN, OF ORANGE, NEW JERSEY, ASSIGNOR TO WESTINGHOUSE ELECTRIC & MANUFACTURING COMPANY, A CORPORATION OF PENNSYLVANIA.

METER STRUCTURE.

Original No. 1,610,565, dated December 14, 1926, Serial No. 641,071, filed May 24, 1923. Application for reissue filed August 23, 1928. Serial No. 301,668.

My invention relates to electrical measuring instruments and particularly to damping and supporting means for the operating mechanisms thereof.

One object of my invention is to provide an electrical measuring instrument that shall comprise a combined insulating supporting base and air damping structure.

Another object of my invention is to prevent eddy current effects in the supporting structure of electrical instruments.

A further object of my invention is to provide an electrical measuring instrument that shall be simple and durable in construction, economical to manufacture and effective in its operation.

Heretofore, in a certain type of electrical measuring instrument, it has been usual to provide a metal base member for the support of the operating mechanism and to provide an air-damping chamber adjacent to or in the base member in which a damping vane attached to the instrument shaft was adapted to operate. This construction required the use of an insulating bridge across the top of the supporting structure for supporting the upper bearing of the shaft to prevent undue eddy current effects in the supporting structure.

In practicing my invention, I provide a preferably single, integral, molded, insulating member which constitutes a combination supporting base and air-damping chamber. This construction effectually prevents eddy current effects in the remaining metal supporting members and permits the employment of a metal bridge, to thereby strengthen the upper supporting structure and to improve the structure as a whole.

Figure 1:
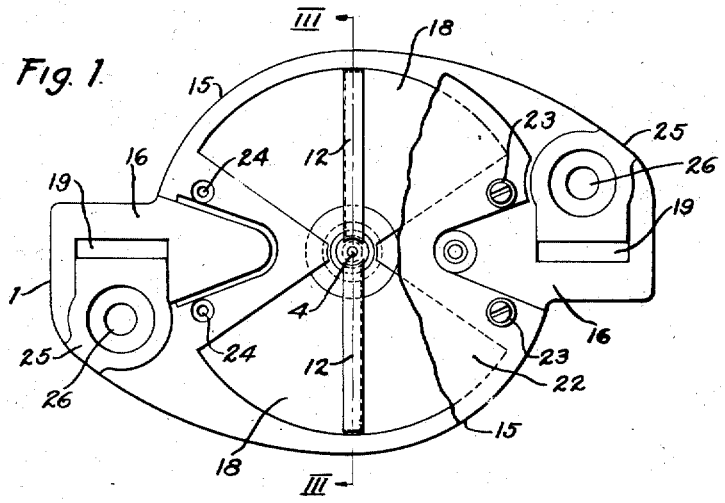
Figure 2:
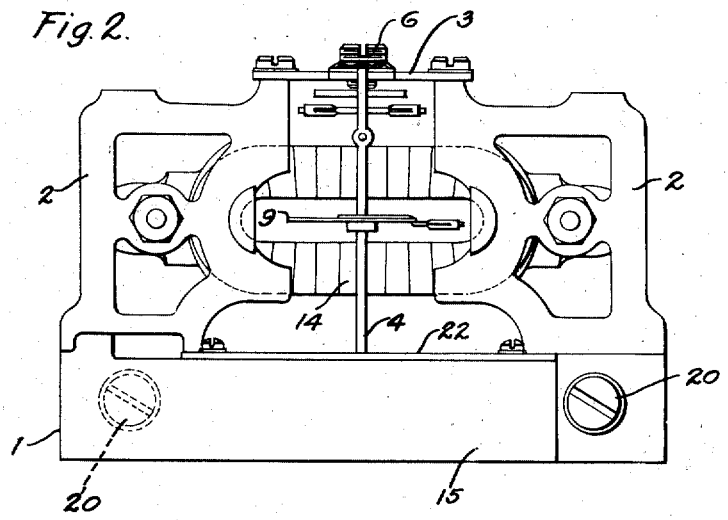
Figure 3:
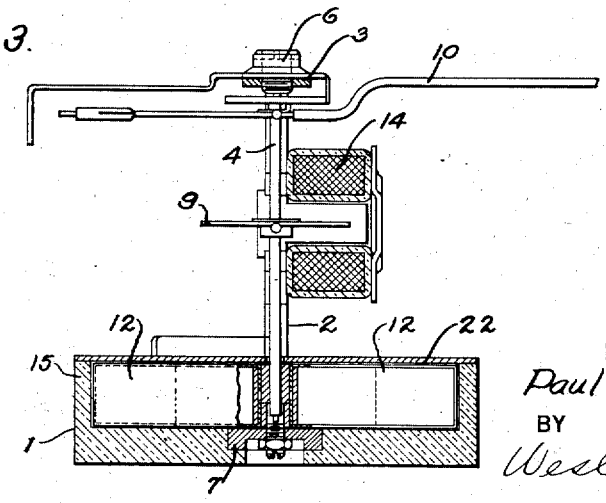

Figure 1, of the accompanying drawing, is a plan view of the combination insulating base and air-chamber member, with the damping vanes and a portion of a lid or cover member therefor in position, Fig. 2 is a side elevational view of the device shown in Fig. 1, with the meter mechanism and its upper supporting structure thereon, and Fig. 3 is a view taken along the line III—III of Fig. 1.

An instrument embodying my invention comprises, in general, a combination insulating supporting base and air-chamber member 1, a pair of metal side brackets 2 supported on the base 1, a metal bridge member 3 extending between the upper portions of the brackets 2, a shaft 4, an upper bearing 6, supported by the bridge 3, for the shaft 4, a lower bearing 7, in the base member 1, for the shaft 4, an armature disk 9, a pointer 10, vanes 12 secured to the shaft 4, and an actuating coil 14 supported by the brackets 2.

The base member 1, constituting the primary portion of my invention, is preferably constructed of a single, integral, molded block or member of fibrous insulating material impregnated with a binder and subjected to heat and pressure to render it very hard and durable. This material is well known in the art. The member 1 is also preferably constructed to be of substantially cylindrical shallow-box like shape, that is, the major portions 15 thereof are of such shape, but is also provided with diametrically opposite portions 16 that are solid and relatively heavy. The portions 16 extend both outwardly and inwardly from the perimeter of the cylindrical portions 15, the inwardly-projecting portions being preferably conical in shape to provide oppositely-disposed, communicating chambers 18 of substantially sector shape for the reception of the vanes 12. The outwardly projecting portions of the portions 16 are provided with molded seat portions or recesses 19 adapted to fit the lower ends of the brackets 2 which are held in position by screws 20. A relatively thin sheet lid or cover member 22 of substantially double-sector shape, but larger in area than the horizontal area of the chambers 18, is secured in position by screws 23 that extend into openings 24 in the base member.

Seat portions 25, formed on the base member 1 adjacent to the recesses 19 are provided with openings 26 for the reception of screws (not shown) by which the base member 1 may be mounted in an instrument casing or on any other suitable member.

In operation, when the armature 9 is attracted by the coil 14, the shaft 4 turns, to thereby turn the vanes 12 in the chambers 18, in a usual and well known manner. This action damps the action of the movable meter parts.

The base member 1, being constructed of relatively heavy durable insulating material, provides a very rigid base for the meter mechanism and also permits the use of the metal bridge member 3. Heretofore, with a metal base, the bridge member 3 has been constructed of insulating material to prevent the circulation of eddy-currents between the brackets 2.

By my invention, such eddy currents are effectively prevented and, by permitting the use of the metal bridge member 3, the strength and durabilty of the mechanism are improved. In addition, the weight of the instrument is reduced and other manufacturing advantages and economies are obtained.

While I have shown and described a particular form of my invention, changes may be effected therein without departing from the spirit and scope thereof, as set forth in the appended claims.

I claim as my invention:

1. The combination with a meter mechanism, a meter shaft and a damping vane, of an insulating base member constituting a damping chamber enclosure for said vane, and a structure including a pair of metal bracket portions mounted on the base member extending substantially normal to a face of the base member and a bridge portion, constituting a support for said shaft, extending between said bracket portions.

2. The combination with a meter mechanism, a meter shaft and a damping-vane device therefor, of a structure constituting a combined insulating supporting base for said mechanism and damping-chamber enclosure for said vane, comprising a single homogeneous substantially cylindrical box-like body of molded insulating material having integral walls surrounding a pair of intercommunicating recesses of substantially sector shape constituting said chamber and a pair of diametrically-opposite portions projecting from the sides of said cylindrical body, and a structure including a pair of metal bracket portions mounted on said portions extending substantially normal to a face of the body and a bridge portion, constituting a support for said shaft, extending between said bracket portions.

3. The combination with a meter mechanism, a meter shaft and a damping-vane, of an insulating base member of substantially discoidal shape constituting a damping-chamber enclosure for said vane, a pair of metal brackets mounted on the base member extending normal to a face of the disc, and a metal bridge member, constituting a support for said shaft, extending between said brackets.

4. A meter comprising an insulating member of substantially discoidal shape constituting a combined supporting base and damping chamber, a pair of metal brackets mounted thereon and extending normal to a surface thereof, a metal bridge member extending between said brackets adjacent to the outer ends thereof, a meter shaft, a bearing for the shaft supported by said base member, another shaft bearing mounted on said bridge and a damping vane carried by the shaft in said base member.

5. The combination with a meter mechanism including a meter shaft having a damping vane thereon, of a base of insulating material embodying means constituting a damping chamber for said vane, and a structure for supporting said shaft comprising means associated with said base and extending substantially normal with respect to a face thereof, and a bridging portion supported by said means for operatively engaging said shaft.

6. The combination with a meter mechanism including a meter shaft and a damping vane secured thereto, of a base of insulating material embodying means constituting a damping chamber for said vane, and a structure for supporting said shaft comprising bracket portions secured to said base and extending substantially normal with respect to a face thereof, and a metallic bridge portion secured to said bracket portions for operatively engaging said shaft.

7. The combination with the operating mechanism of an electrical instrument including a rotatable shaft and a damping vane secured thereto, of means for rotatably supporting said shaft comprising a base of molded insulating material embodying means constituting a damping chamber for said vane, bearing means within said chamber for engaging one end of said shaft, and means secured to said base and projecting therefrom for engaging the other end of said shaft.

8. The combination with a meter mechanism, a meter shaft and a damping-vane device therefor, of a structure constituting a combined insulating supporting base for said mechanism and damping-chamber enclosure for said vane comprising a single homogeneous substantially cylindrical box-like body of molded insulating material having integral walls surrounding a pair of intercommunicating recesses of substantially sector shape constituting said chamber and a pair of diametrically-opposite portions projecting from the sides of said cylindrical body, and a structure including a pair of bracket portions mounted on said portions extending substantially normal to a face of the body and a bridge portion, constituting a support for said shaft, extending between said bracket portions.

9. The combination with a meter mechanism, a meter shaft and a damping-vane, of an insulating base member of substantially discoidal shape constituting a damping-chamber enclosure for said vane, a pair of brackets mounted on the base member extending normal to a face of the disc, and a metal bridge member, constituting a support for said shaft, extending between said brackets.

10. A meter comprising an insulating member of substantially discoidal shape constituting a combined supporting base and damping chamber, a pair of metal brackets mounted thereon, a metal bridge member extending between said brackets adjacent to the outer ends thereof, a meter shaft, a bearing for the shaft supported by said base member, another shaft bearing mounted on said bridge and a damping vane carried by the shaft in said base member.

PAUL MacGAHAN.